United States Patent [19]

Orlitzky

[11] Patent Number: 5,732,794
[45] Date of Patent: Mar. 31, 1998

[54] AUGER-DRIVEN AUTOMATIC LUBRICATOR

[76] Inventor: Anton T. Orlitzky, 343 Rosehill Wynd, Delta, B. C., Canada, V4M 3L8

[21] Appl. No.: 315,954

[22] Filed: Sep. 30, 1994

[51] Int. Cl.⁶ ..................................................... F16N 7/14
[52] U.S. Cl. ........................... 184/61; 184/31; 184/27.1; 222/326; 222/333
[58] Field of Search .................... 184/6, 6.1, 6.4, 184/27.1, 45.1, 31, 61; 222/326, 333

[56] References Cited

U.S. PATENT DOCUMENTS

| | | |
|---|---|---|
| 612,075 | 10/1898 | Webendorfer ................. 184/61 |
| 897,849 | 9/1908 | Prescott ......................... 184/61 |
| 1,162,997 | 7/1915 | Ferguson . |
| 1,277,842 | 9/1918 | Brinser . |
| 2,694,508 | 11/1954 | Petrenchak . |
| 3,608,672 | 9/1971 | Dandridge ................... 184/7.4 |
| 3,774,721 | 11/1973 | Hollowell ................. 184/105.2 |
| 3,774,821 | 11/1973 | Liversa . |
| 3,815,787 | 6/1974 | Spies . |
| 3,984,033 | 10/1976 | Groth et al. . |
| 3,987,869 | 10/1976 | Bowers .................... 184/105.2 |
| 4,023,648 | 5/1977 | Orlitzky et al. . |
| 4,045,185 | 8/1977 | Azemar et al. . |
| 4,171,072 | 10/1979 | Davis, Jr. . |
| 4,257,540 | 3/1981 | Wegmann et al. . |
| 4,445,168 | 4/1984 | Petryszyn .................... 184/6.1 |
| 4,671,386 | 6/1987 | Orlitzky . |
| 4,711,320 | 12/1987 | Dombroski et al. ......... 184/3.2 |
| 4,770,613 | 9/1988 | Hoover et al. ........... 184/105.2 |
| 4,941,550 | 7/1990 | Blake . |
| 5,060,205 | 10/1991 | Phelan ........................ 367/98 |
| 5,105,912 | 4/1992 | Heister . |
| 5,125,480 | 6/1992 | Gregory et al. ............ 184/6.4 |
| 5,181,585 | 1/1993 | Braun et al. ............... 184/6.4 |
| 5,182,720 | 1/1993 | Beck et al. .................. 184/108 |
| 5,271,528 | 12/1993 | Chien . |

FOREIGN PATENT DOCUMENTS

| | | |
|---|---|---|
| 2013504 | 3/1969 | Germany . |
| 347340 | 4/1937 | Italy . |
| 166690 | 3/1934 | Switzerland . |
| 80214553 | 10/1992 | Taiwan . |
| 316415 | 12/1971 | U.S.S.R. . |

OTHER PUBLICATIONS

Microchip App Note AN512 (1993).

Primary Examiner—Thomas E. Denion
Attorney, Agent, or Firm—William S. Lovell

[57] ABSTRACT

An automatic lubricator is microprocessor controlled and can be programmed to deliver lubricant to a bearing or the like at selected intervals. A pressure for lubricant delivery in the range of 80–90 psi can be attained in less than a minute, but the bulk of the lubricant is kept under a minimal pressure of about 7 psi to avoid bleeding. Operation of the lubricator rests upon the use of a minor pressure imposed by a spring to force lubricant into the threads of an auger, so that rotation of the auger by a servo motor controlled by the microprocessor then dispenses the lubricant while at the same time providing a mixing action to the lubricant. Provision is also made for automatic shutting off of the lubricator at a preselected temperature.

19 Claims, 3 Drawing Sheets

AUGER-DRIVEN AUTOMATIC LUBRICATOR

RELATION TO OTHER APPLICATIONS

This application relates to in U.S. patent application Ser. No. 08/278,116 filed Jul. 20, 1994, which is a continuation-in-part of application Ser. No. 08/091,776 filed Jul. 14, 1993, which in turn is a continuation of application Ser. No. 07/919,173 filed Jul. 23, 1992.

BACKGROUND OF THE INVENTION

1. Field of the Invention

The invention relates to methods and apparatus for automatic lubricating of machinery, particularly bearings, that have fittings thereon adapted to receive a quantity of grease or similar lubricant, and more specifically to methods and apparatus that involve a selectable scheduling of lubricating and the active transport of a lubricant, especially by an auger device, that will then inject such lubricant through such fittings into particular machinery that has been connected thereto.

2. Background Information

Lubricators that utilize compressed air, compressed springs or a gas generating cartridge as a driving force to eject lubricant into a machine are known in the prior art. For example, U.S. Pat. No. 4,023,648 issued May 17, 1977 to Orlitzky (the present inventor) et al. describes a lubricant applicator that electrolytically generates a gas as a driving means to force lubricant out of a chamber into the bearing fitting. Also, U.S. Pat. No. 4,671,386 issued Jun. 9, 1987 to Orlitzky (the corresponding Canadian patent issued as No. 1,280,700 on Feb. 26, 1991) describes an applicator in which the required pressure is delivered by a bellows. Automatic control of the lubricating process is shown in U.S. patent application Ser. No. 08/278,116 filed Jul. 20, 1994, which describes a programmable, electrical motor-driven lubricator that in different embodiments forces lubricant from a chamber by the operation of a gear- or lever-driven piston, or by a bellows.

However, existing portable lubricators have problems with supplying a quantity of lubricant quickly, and in maintaining a controlled quantity of lubricant over a range of back pressures and ambient temperatures. If the back pressure is too high, or the temperature too low, substantial time may elapse before the lubricant reaches the machinery intended to be lubricated, such as a bearing, and the latter may then become starved for lubricant and suffer damage accordingly. In particular, it is found that with a gas generating cell, it may take seven days to overcome a line resistance of 15 psi before the lubricant actually reaches the point of lubrication. Conversely, under high temperature conditions there is the opposite danger of overlubricating, which can also be damaging.

Another disadvantage of such prior art devices lies in the need to keep the lubricant under a high constant pressure. Although the indicated piston and bellows devices provide pressures that are much more readily available than those of the gas devices, such pressures tend to separate out the component ingredients of the lubricant, i.e., a type of separation called "bleeding" occurs in which the oil of the lubricant (generally about 90% thereof) is separated from the absorbent materials also contained therein, such as lithium and sodium bentonite, various hydroxide and aluminum complexes, EP additives, and waxes, thereby having adverse effects on its lubricating properties.

What is needed and would be useful, therefore, is a method and apparatus for carrying out such lubrication in a manner that will provide lubricant quickly, and to dispense lubricant both automatically and either continuously or at some pre-set rate that is less susceptible to the effects of back pressure and ambient temperature. Preferably, because of the aforesaid problem of bleeding, such a method and apparatus will also provide means for dispensing lubricant as indicated without the need to keep that lubricant under a high constant pressure, and secondly to provide as well some means for re-mixing the lubricant prior to its being dispensed, so as to counteract any bleeding that might occur over time.

SUMMARY OF THE INVENTION

Each of the aforesaid objectives is accomplished by the present invention. Specifically, the invention comprises a portable device for single-point or multiple-point lubrication that includes a container having an outlet to be connected to the lubricating system of the machinery; a rotating lubricant dispensing mechanism such as a screw or auger between the container and the outlet; a spring acting on a movable piston or the like within the container to provide a force against a quantity of lubricant contained within the container, thereby forcing said lubricant into the turns of the auger; an electric motor to rotate the auger to build up pressure in the outlet therefrom; a battery driving the motor; a circuit that controls the duration and frequency of auger rotation; and a switch for making and breaking connection to that control circuit. In addition to its principal task of ejecting lubricant from the outlet, rotation of the auger also tends to re-mix the lubricant in the event the same has become separated into its components, thereby restoring its lubricating capabilities.

In terms of performance, it is found that a preferred embodiment of the present invention having a motor driven at 70 rpm, a pressure of 20 psi can be obtained within 15 seconds. The maximum pressure attainable with the auger is 86 psi, which is attainable within 25 seconds as to No. 2 grease and within 30 seconds as to No. 1 grease. Pressures in the 80–90 psi range are sufficiently low that no seals will be damaged since, e.g., it requires pressures of 400–800 psi to burst a seal in a bearing. Also because of such low pressure operation, the present device can be refilled with an ordinary grease gun, while at the same time a pressure release valve is provided to ensure that no damage will occur to the device even when refilling with a high pressure gun of 2,000 psi capacity. The operating pressure of the grease within the auger itself is about 7 psi hence bleeding is minimized and in any event, as noted above, any bleeding is counteracted by the mixing action of the auger itself.

BRIEF DESCRIPTION OF THE DRAWINGS

A preferred embodiment of the invention will now be described in detail with reference to the accompanying drawings, which are intended to be exemplary only and in which.

DETAILED DESCRIPTION OF THE INVENTION

Figure 1:
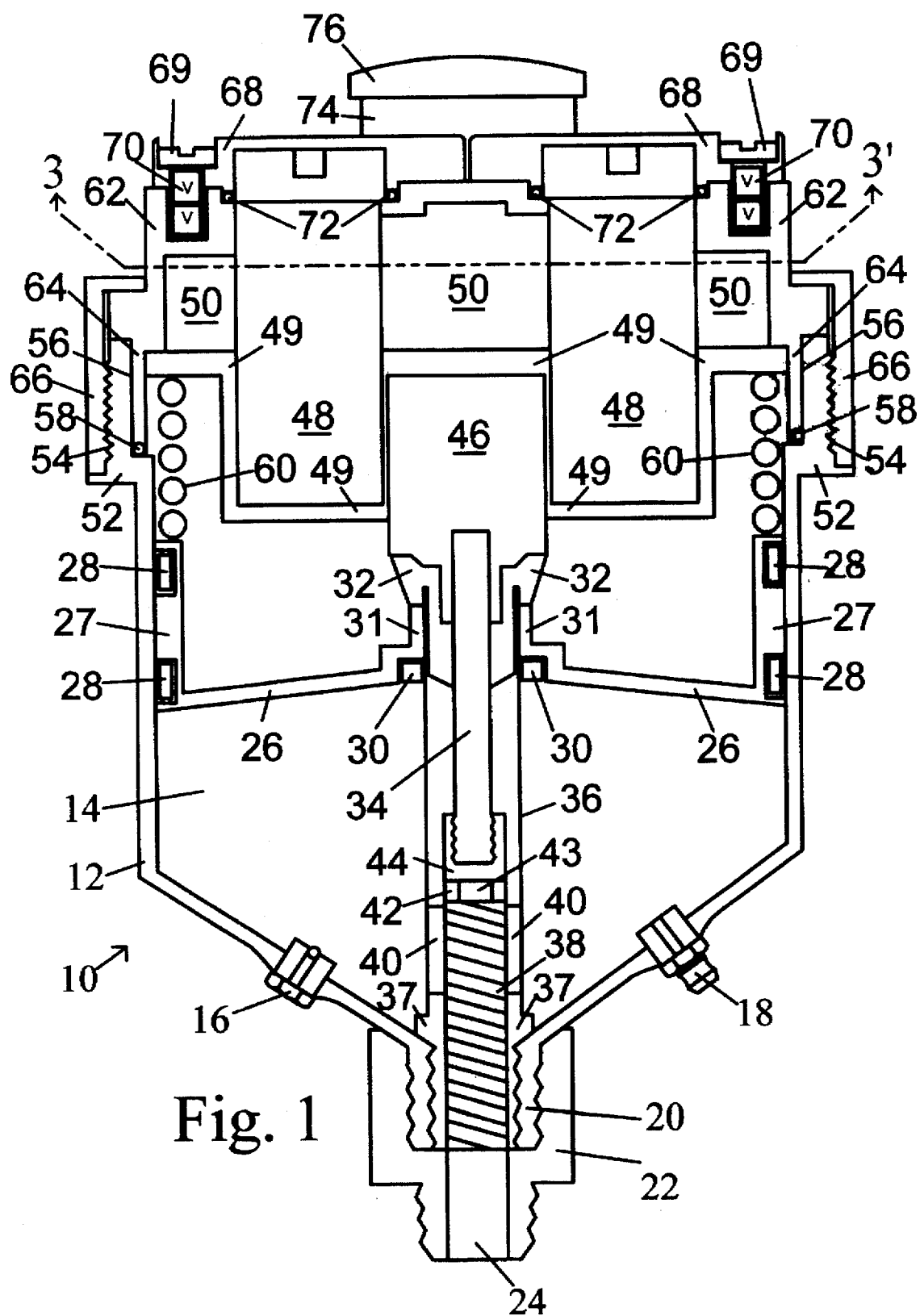
FIG. 1 shows in vertical elevation a cross-section through the plane 1–1' of FIG. 3 of a lubricator which represents a preferred embodiment of the invention.

FIG. 1 depicts in vertical elevation a cross-sectional drawing a lubricator 10 constructed within a typically cylindrical, elongate chamber 12. The lower portion of chamber 12 is generally V-shaped with a hollow interior, thus permitting placement therein of a quantity of grease or lubricant 14. On the sides of that V-shaped portion there is installed on one side a pressure relief valve 16, and typically on the opposite side thereof a zirk or alamite fitting through which lubricant 14 can be introduced into chamber 12.

The bottom end of chamber 12 terminates in an externally threaded round coupler 20, typically of ⅜ inch size, and exterior to that is attached a thread adaptor 22 having ⅜ inch interior threads and an extension having ¼ inch exterior threads for convenient attachment to a grease fitting on a bearing or the like. As will be described below, both coupler 20 and thread adaptor 22 have hollow interiors through which grease or lubricant are forced out through an opening 24 leading outwardly from thread adaptor 22.

Above lubricant 14 a piston 26 having a tubular upwardly extending outer side wall 27 encircles the interior of chamber 12, the external periphery of outer side wall 27 being in close contact with the interior surface of chamber 12 and having disposed therein a set of piston rings 28 for maintaining a tight seal thereto. Piston 26 is further adapted to accommodate about the central, vertical axis thereof a toroidal piston cup seal 30 which likewise ensures a tight seal above lubricant 14. Piston 26 further comprises a tubular upwardly extending inner side wall 31 which is adapted to receive therein a cup-shaped shaft coupler 32, through the center of which passes a central shaft 34 and around the outer periphery of which, but inwardly from inner side walk 31, there passes a cylindrical auger housing 36. At the lower end of auger housing 36 there is attached a threaded portion 37 which has exterior threads corresponding in size to the internal threads of coupler 20, whereby auger housing 36 is threadably attached to coupler 20 and provides a seal against leakage of lubricant 14 at the lower end of chamber 12. At the lower end of central shaft 34 there is axially attached (as hereinafter described) an auger 38 which extends further to terminate at a point in line with the distal terminus of coupler 20.

Figure 2:
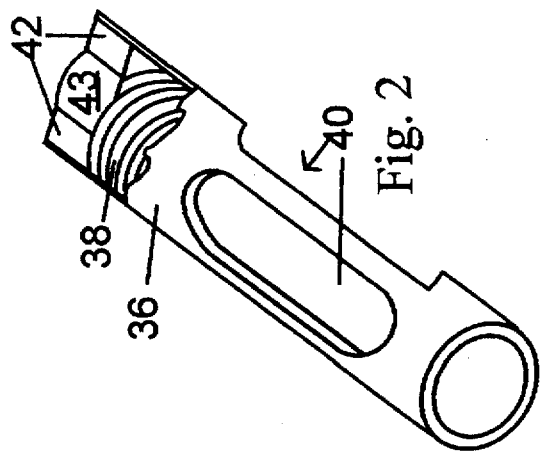
FIG. 2 shows a detail of the manner in which lubricant enters the auger of the lubricator of FIG. 1.

However, as shown in greater detail in FIG. 2, auger housing 36 further comprises a set of holes or slots 40 therein at points within the region of chamber 12 containing lubricant 14, which permits passage of portions of lubricant 14 into the threads of auger 38 whereby rotation of auger 38 will cause longitudinal (i.e., downward in FIG. 1) transport of such quantity of lubricant that has entered the threads thereof. (How the impetus is generated that causes lubricant 14 actually to enter auger 38 will be described below.) Rotation of auger 38 thus causes the dispensing of a portion of lubricant 14 outwardly through opening 24 and into a grease fitting (not shown) to which thread adaptor 22 has been connected. To prevent upward (in FIG. 1) movement of lubricant that has entered auger 38, first O-ring 42 is disposed about auger shaft 43 which extends axially from auger 38, and shaft coupler 44 extends from auger shaft 43 to make threadable connection to central shaft 34.

In the region of lubricator 10 on the side of piston 26 opposite that part of chamber 12 that contains lubricant 14, DC motor 46 attaches axially to central shaft 34 and provides the rotational movement of the same so as to rotate auger 38. Power for DC motor 46 derives from two batteries 48 such as the 9 volt lithium batteries sold under the trade name ULTRALIFE U9VL. Batteries 48 are disposed within lubricator 10 in a battery holder 49 that extends basket-like on either side of DC motor 46, and control of DC motor 46 is provided from circuit board 50 which is conveniently located adjacent thereto.

Figure 3:
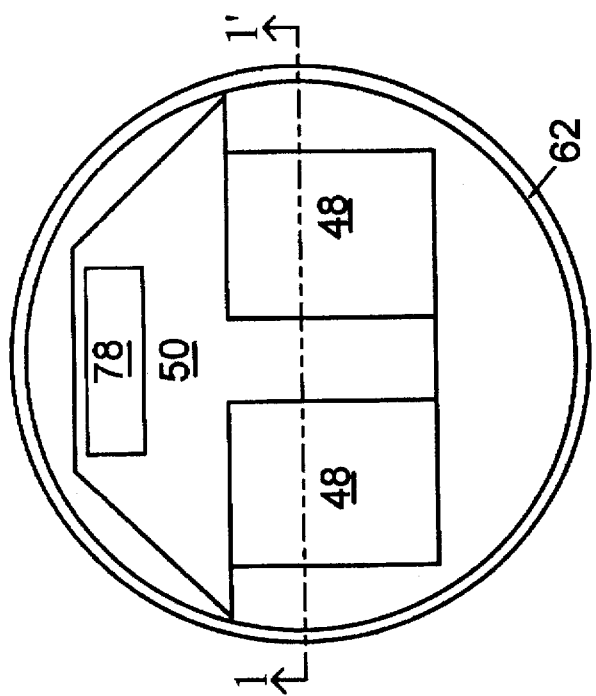
FIG. 3 shows a cross-section through the plane 3–3' of FIG. 1 which shows the relative disposition of the battery and circuit board compartments of the lubricator of FIG. 1.

More specifically, as shown schematically in FIG. 3, circuit board 50 is roughly T-shaped, with the leg of the T extending between batteries 48 (i.e., outwardly from FIG. 1) while the relatively thicker and squarish top cross of the T extends on either side of batteries 48 (i.e., transversely at the rear of batteries 48 in both of FIGS. 1 and 3). Using batteries 48 of the type indicated, it is found that in normal operation a chamber 12 containing 150 cc of lubricant 14 can be emptied out five times before battery replacement becomes necessary, i.e., a single pair of batteries 48 will provide enough power to dispense 750 cc of lubricant.

In the region of lubricator 10 which includes DC motor 46, batteries 48, battery holder 49 and circuit board 50, chamber 12 is extended outwardly by a circular rim 52 that has external threads 54 and inwardly therefrom a toroidal cavity 56 containing at the bottom thereof a second O-ring 58. Disposed inwardly from toroidal cavity 56 is a toroidal spring 60, the lower surface of which abuts the upper surface of outer side wall 27 of piston 26. Battery holder 49 also extends outwardly to the periphery of the interior of lubricator 10 so as to rest upon the upper surface of toroidal spring 60 and compress the same. The strength of toroidal spring 60 is preferably adapted to provide a downward force against piston 26 that will produce a pressure of about 7 psi against lubricant 14, thereby providing a relatively mild pressure which suffices to force lubricant t4 into the threads of auger 38. As noted earlier, since it is the rotation of auger 38 which actually forces lubricant 14 to be exuded from lubricator 10, and not any pressure as such on the bulk of lubricant 14, not only is bleeding of lubricant 14 minimized but the rotation of auger 38 also provides a mixing of lubricant 14 to help ensure that it is of uniform composition throughout.

Above circular rim 52 there is a housing 62 which includes a downwardly-extending toroidal extension 64 that is sized to fit within toroidal cavity 56 and abut at its distal end against second O-ring 58. A portion of housing 62 also rests against the aforesaid outward extension of battery holder 49 so as to hold the same down against toroidal spring 60, thereby to exert the aforesaid downward force against piston 26. Although housing 62 includes further components as will be set forth below, it may now be noted that battery housing 62 is held in the position aforesaid by an external, toroidal locking rim 66 which threadably attaches to circular rim 52.

Figure 4:
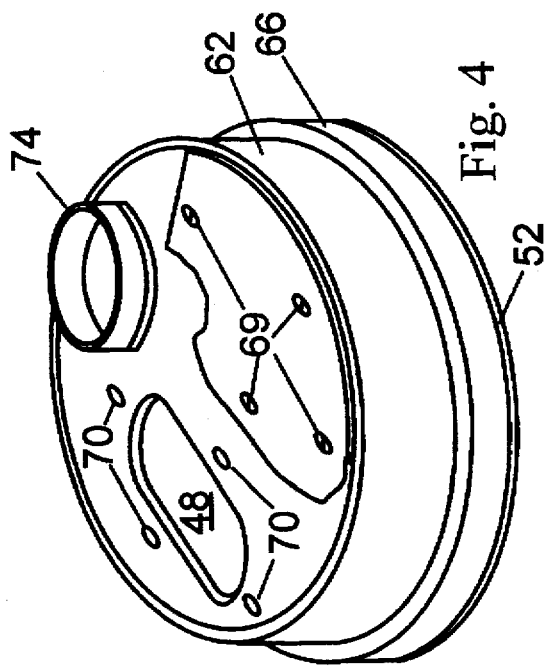
FIG. 4 shows an oblique view of the top of the lubricator of FIG. 1 with one of two battery caps in place.

In addition to including appropriate spaces for DO motor 46, batteries 48, battery holder 49 and circuit board 50, battery housing 62 further comprises battery caps 68 attached to battery housing 62 by convenient means, e.g., by screws 69 that engage thread inserts 70 placed in the upper surface of battery housing 62. Third O-rings 72, also on the upper surface of battery housing 62, encircle batteries 48 and are engaged by battery caps 68. Switch housing 74, the function of which will be described below, protrudes upwardly from battery housing 62 and has placed thereon a switch cap 76. The aforesaid manner of construction can also be seen more clearly in FIG. 4.

Figure 5:
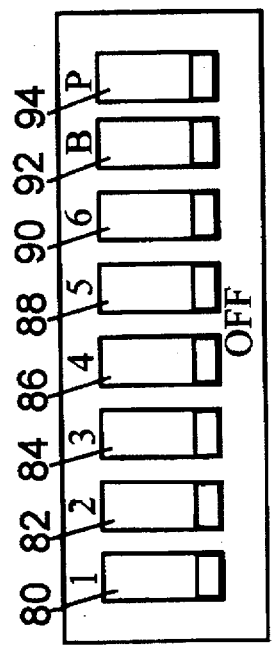
FIG. 5 shows a multi-element switch that is used to control the operation of the lubricator of FIG. 1.

Atop circuit board 50 as shown in FIG. 3, and disposed so as to be accessible through switch housing 74, there is a switch array 78 by which the times of operation of lubricator 10 are set. As shown in more detail in FIG. 5, switch array 78 comprises a set of eight DIP switches 80-94 that are respectively labeled as shown in Table I:

TABLE I

| 80 | 82 | 84 | 86 | 88 | 90 | 92 | 94 |
|----|----|----|----|----|----|----|----|
| 1  | 2  | 3  | 4  | 5  | 6  | B  | P  |

Switches 80-90, labeled 1-6, serve to set the rates of operation of lubricator 10. An exemplary column of time periods, representing the number of days that it will take to empty lubricator 10 of lubricant 14 when the switch positions are as shown in the remaining columns of each row, is shown in Table II. The increment of change between rows (i.e., switch settings) has been set at fifteen days in Table II, although as described hereinafter that increment is adjustable to conform to the needs of a particular user. Switch 92, labeled B, serves as a "booster" switch which when turned on will double whatever may be the currently established rate of dispensing lubricant 14, e.g., if all of switches 80-90 are turned "ON" so as to define a time of 945 days for emptying lubricator 10 of lubricant 14, turning on switch 92 will double the rate of dispensation so that lubricator 10 will be emptied instead in 472.5 days. Switch 94, labeled P, is a primer or manual switch that when turned on causes continual operation of motor 46 and rotation of auger 38 so as to dispense lubricant 14 continually to prime or clean out a line. As also described below, an LED is set to flash periodically during any time that motor 46 is operating, i.e., when auger 38 is rotating and lubricant 14 is being dispensed.

TABLE II

| Time | 1 | 2 | 3 | 4 | 5 | 6 |
|------|---|---|---|---|---|---|
| OFF | OFF | OFF | OFF | OFF | OFF | OFF |
| 15  | ON  | OFF | OFF | OFF | OFF | OFF |
| 30  | OFF | ON  | OFF | OFF | OFF | OFF |
| 45  | ON  | ON  | OFF | OFF | OFF | OFF |
| 60  | OFF | OFF | ON  | OFF | OFF | OFF |
| 75  | ON  | OFF | ON  | OFF | OFF | OFF |
| 90  | OFF | ON  | ON  | OFF | OFF | OFF |
| 105 | ON  | ON  | ON  | OFF | OFF | OFF |
| 120 | OFF | OFF | OFF | ON  | OFF | OFF |
| 135 | ON  | OFF | OFF | ON  | OFF | OFF |
| 150 | OFF | ON  | OFF | ON  | OFF | OFF |
| 165 | ON  | ON  | OFF | ON  | OFF | OFF |
| 180 | OFF | OFF | ON  | ON  | OFF | OFF |
| 195 | ON  | OFF | ON  | ON  | OFF | OFF |
| 210 | OFF | ON  | ON  | ON  | OFF | OFF |
| 225 | ON  | ON  | ON  | ON  | OFF | OFF |
| 240 | OFF | OFF | OFF | OFF | ON  | OFF |
| 255 | ON  | OFF | OFF | OFF | ON  | OFF |
| 270 | OFF | ON  | OFF | OFF | ON  | OFF |
| 285 | ON  | ON  | OFF | OFF | ON  | OFF |
| 300 | OFF | OFF | ON  | OFF | ON  | OFF |
| 315 | ON  | OFF | ON  | OFF | ON  | OFF |
| 330 | OFF | ON  | ON  | OFF | ON  | OFF |
| 345 | ON  | ON  | ON  | OFF | ON  | OFF |
| 360 | OFF | OFF | OFF | ON  | ON  | OFF |
| 375 | ON  | OFF | OFF | ON  | ON  | OFF |
| 390 | OFF | ON  | OFF | ON  | ON  | OFF |
| 405 | ON  | ON  | OFF | ON  | ON  | OFF |

TABLE II-continued

| Time | 1 | 2 | 3 | 4 | 5 | 6 |
|------|---|---|---|---|---|---|
| 420 | OFF | OFF | ON  | ON  | ON  | OFF |
| 435 | ON  | OFF | ON  | ON  | ON  | OFF |
| 450 | OFF | ON  | ON  | ON  | ON  | OFF |
| 465 | ON  | ON  | ON  | ON  | ON  | OFF |
| 480 | OFF | OFF | OFF | OFF | OFF | ON  |
| 495 | ON  | OFF | OFF | OFF | OFF | ON  |
| 510 | OFF | ON  | OFF | OFF | OFF | ON  |
| 525 | ON  | ON  | OFF | OFF | OFF | ON  |
| 540 | OFF | OFF | ON  | OFF | OFF | ON  |
| 555 | ON  | OFF | ON  | OFF | OFF | ON  |
| 570 | OFF | ON  | ON  | OFF | OFF | ON  |
| 585 | ON  | ON  | ON  | OFF | OFF | ON  |
| 600 | OFF | OFF | OFF | ON  | OFF | ON  |
| 615 | ON  | OFF | OFF | ON  | OFF | ON  |
| 630 | OFF | ON  | OFF | ON  | OFF | ON  |
| 645 | ON  | ON  | OFF | ON  | OFF | ON  |
| 660 | OFF | OFF | ON  | ON  | OFF | ON  |
| 675 | ON  | OFF | ON  | ON  | OFF | ON  |
| 690 | OFF | ON  | ON  | ON  | OFF | ON  |
| 705 | ON  | ON  | ON  | ON  | ON  | ON  |
| 720 | OFF | OFF | OFF | OFF | ON  | ON  |
| 735 | ON  | OFF | OFF | OFF | ON  | ON  |
| 750 | OFF | ON  | OFF | OFF | ON  | ON  |
| 765 | ON  | ON  | OFF | OFF | ON  | ON  |
| 780 | OFF | OFF | ON  | OFF | ON  | ON  |
| 795 | ON  | OFF | ON  | OFF | ON  | ON  |
| 810 | OFF | ON  | ON  | OFF | ON  | ON  |
| 825 | ON  | ON  | ON  | OFF | ON  | ON  |
| 840 | OFF | OFF | OFF | ON  | ON  | ON  |
| 855 | ON  | OFF | OFF | ON  | ON  | ON  |
| 870 | OFF | ON  | OFF | ON  | ON  | ON  |
| 885 | ON  | ON  | OFF | ON  | ON  | ON  |
| 900 | OFF | OFF | ON  | ON  | ON  | ON  |
| 915 | ON  | OFF | ON  | ON  | ON  | ON  |
| 930 | OFF | ON  | ON  | ON  | ON  | ON  |
| 945 | ON  | ON  | ON  | ON  | ON  | ON  |

Figure 6:
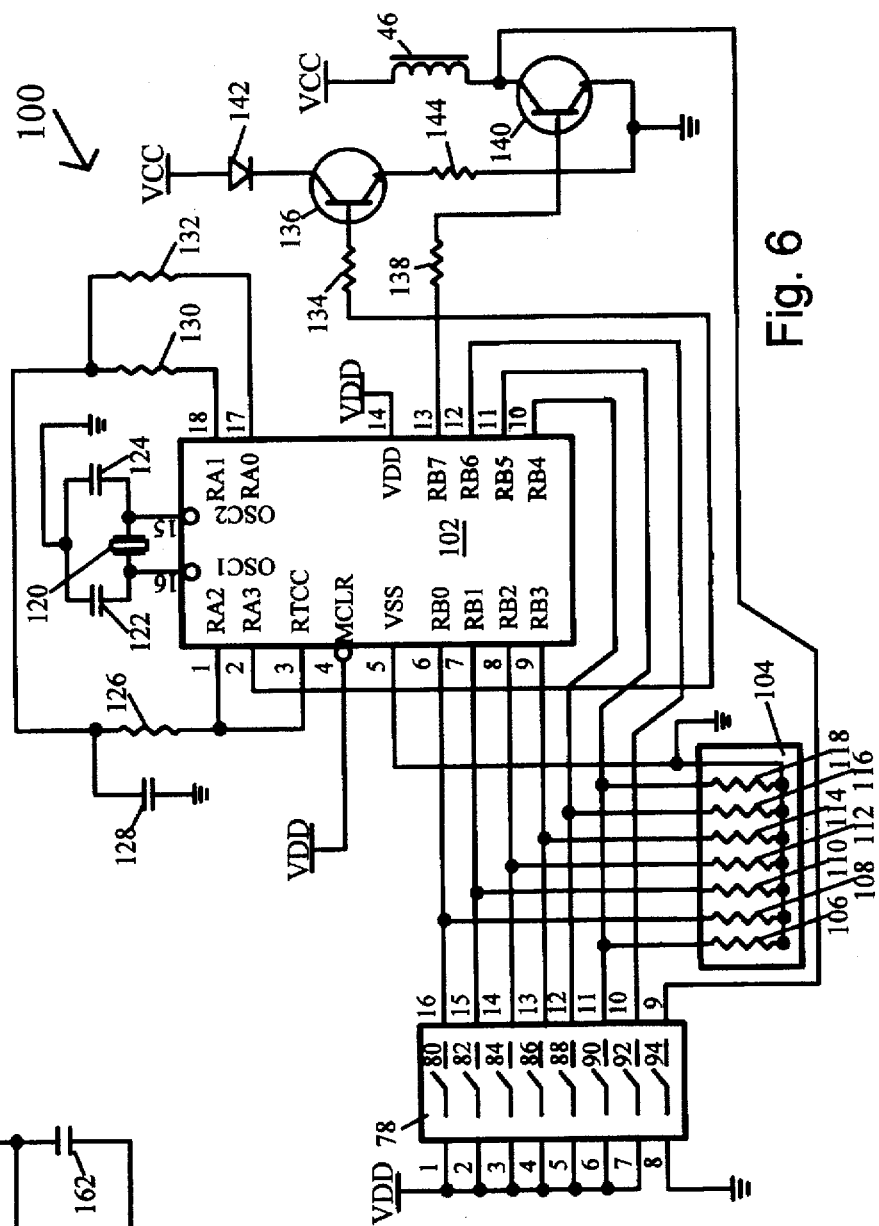
FIG. 6 shows a diagram of the control circuit for the lubricator of FIG. 1.

Now shown in FIG. 6 is a diagram of the circuit incorporated on circuit board 50. Circuit 100 serves to control the times of dispensation of lubricant by lubricator 10, i.e., the times of operation of motor 46 which causes rotation of auger 38 and hence dispensation of lubricant as previously described. Since particular embodiments of the invention may be placed in applications that have a wide range of different conditions of back pressure, bearing demands and the like, circuit 100 includes provisions for varying the timing of such lubricant dispensation.

Circuit 100 includes switch array 78 and switches 80-94 in schematic form. Switch array 78 includes terminals connecting to one side of each of switches 80-92, said terminals on the switch array being respectively numbered 1-7 and in circuit 100 are all connected to VDD. On that same side of switch array 78, switch 94 is connected to ground through terminal 8.

Circuit 100 further comprises resistor array 104, containing a set of first-seventh resistors 106-118, each of which preferably has a resistance of about 2.2 KΩ. The sides of switches 80-90 opposite their previously noted terminals connecting to VDD have external terminals that are numbered on switch array 78 as 16, 15, 14, 13, 12, and 11, respectively, and connect therethrough to proximal ends of first-seventh resistors 106-118, respectively. The distal ends of first-seventh resistors 106-118 are mutually interconnected and connect also to ground and to terminal 5 of microprocessor (MP) 102, which constitutes the VSS terminal thereof. Terminal 11 of switch array, which connects to the side of switch 90 opposite the connection thereof to VDD, also connects to the proximal side of first resistor 106.

First-seventh resistors 106-118 provide a pull-down resistive network for the switch inputs to MP 102. That is, in addition to the aforesaid connections to first–seventh resistors 106–118, terminals 16, 15, 14, 13, 12, and 11, as well as terminal 10, connect to MP 102 as shown in Table III:

TABLE III

| Array 78 | 16 | 15 | 14 | 13 | 12 | 11 | 10 |
|---|---|---|---|---|---|---|---|
| MP 102 | 6 | 7 | 8 | 9 | 10 | 11 | 12 |
| Input | RB0 | RB1 | RB2 | RB3 | RB4 | RB5 | RB6 |

In Table III, the first row represents the terminals of switch array 78, the second row represents the terminals of MP 102 to which the terminals in the same column of the first row connect, and the third row gives the standard notation for the aforesaid input terminals of MP 102.

MP 102 is preferably an EPROM such as the PIC6C54 manufactured by Microchip Technology, Inc., i.e., a known type that can easily be programmed by a person of ordinary skill in the art. The power for MP 102 is provided by a connection to the MCLR input (terminal 4) thereof to VDD (as produced in a separate circuit described hereinafter). An oscillator circuit for timing the operation of lubricator 10 is made up of crystal 120 which connects on either side thereof to ground through first and second capacitors 122, 124 (each about 15 pf), and also on either side thereof to terminals 15 and 16 of MP 102 labeled as "OSC 1" and "OSC2." Crystal 120 is preferably of a low power consumption type, and operates at a frequency of about 32.768 kHz. The RA2 and RTCC connections of MP 102, which are respectively terminals 1 and 3 thereof, connect through eighth resistor 126 and then third capacitor 128 to ground. The RA1 terminal of MP 102 (terminal 18) connects through ninth resistor 130 to that same third capacitor 128 and thence to ground, and similarly the RA0 terminal of MP 102 (terminal 17) connects through tenth resistor 132 through third capacitor 128 to ground.

Ninth resistor 130 is preferably a Fenwal thermistor (e.g., of the type PN6501), the measured resistance ($R_m$) of which is used to sense the device temperature on the basis of which the operation of lubricator 10 can be terminated. Ninth resistor 130 constitutes a part of a capacitive charging circuit that also includes eighth resistor 126, third capacitor 128, and tenth resistor 132. Eighth resistor 126 has a small resistance of about 100–200 Ω and serves to limit current through terminal 1 (RA2) of MP 102. Through terminal 17 (RA0) of MP 102, a reference voltage $V_r$ (e.g., VDD at 3.6 volts) is applied to tenth resistor 132 ($R_c$) so that third capacitor 128 (about 0.83 µf) commences charging to a threshold voltage $V_t$ (e.g., 2.5 volts), and a reference value $T_c$ for the time of charging is stored in the MP 102 memory. Tenth resistor 132 will have a calibration resistance $R_c$ of about 2.2 MΩ, but in any case $R_c$ cannot exceed about one-half the resistance $R_m$ of ninth resistor 130 (i.e., the thermistor). After discharge of third capacitor 128 under the control of MP 102, reference voltage $V_r$ is applied to ninth resistor 130 and the charging time $T_m$ in passing current through ninth resistor 130 is determined so as to yield the resistance value $R_m$ thereof in accordance with the formula $R_m=(T_m/T_c)R_c$. On the basis of lookup tables stored in MP 102, the temperature of ninth resistor 130 can be ascertained, or preferably the temperature dependent $R_m$ value can be used to trigger a selected shut-off of circuit 100. MP 102 is thus programmed by standard "burn-out" methods such that with the aforesaid resistance and capacitance values so selected, at a temperature of about –25 degrees Celsius ninth resistor 130 will have a resistance value $R_m$ that will disable motor enable pin 13 (RB7) of MP 102 as discussed below.

The further connections of MP 102 that serve to operate motor 46 are found at the RA3 terminal thereof (terminal 2) which connects through eleventh resistor 134 (e.g., 1 MΩ) to the base of first BJ transistor 136, and at the RB7 terminal thereof (terminal 13) which connects through twelfth resistor 138 (e.g., 1 MΩ) to second BJ transistor 140. Both of first and second BJ transistors 136, 140, which may be of the type 2N6427, are preferably Darlington transistors that offer a high input impedance and high gain, and are also capable of carrying through their respective collectors the high current drawn in the operation of motor 46. The collector of first BJ transistor 136 connects through LED 142 to VCC, and the collector of second BJ transistor 140 connects through servo motor 46 to VCC. The emitter of first BJ transistor 136 connects through thirteenth resistor 144 (e.g., 1 KΩ) to ground, while the emitter of second BJ transistor 140 connects to ground directly. Terminal 14 of MP 102 also connects to VDD.

In operation, turning on any of switches 80–90 connects VDD as the input to MP 102 on the particular line, thereby permitting an output to be generated on the MP 102 output lines RA3 and RB7 through respective eleventh and twelfth resistors 134, 138 to the base connections of first and second BJ transistors 136, 140. As indicated in Table II, the specific time periods of transistors 136, 140. As indicated in Table II, the specific time periods of such output are in each case determined by the programming of MP 102. Turning on first BJ transistor 136 will cause activation of LED 142 to emit light, and turning on second BJ transistor 140 connects motor 46 between VCC and ground, hence motor 46 begins operating. With the circuit components as indicated, LED 142 emits light at a rate of about one flash every 15 seconds, but upon disabling of motor enable pin 13 (RB7) of MP 102 at temperatures below –25 degrees Celsius as described above, that flash rate becomes about one flash every 30 seconds, and an operator can thus detect that the operation of lubricator 10 has been shut off. (Of course, an alternative audible display, as with a buzzer or the like, could also be employed.) As noted earlier, switch 92 is used to cause doubling of the rate of motor operations, i.e., application of VDD to MP 102 input terminal RB6 (terminal 12) will through the internal programming of MP 102 cause an effective doubling of the clock rate. Again, although there are specific time periods shown in Table II for emptying lubricator 10 of lubricant 14, it will be understood that such time periods are arbitrary and can be programmed to have different values as the user of the present invention may desire. As also noted earlier, switch 94 serves to turn motor 46 on continually, as can be seen in circuit 100 wherein switch 94 provide a direct connection of motor 46 to ground.

Figure 7:
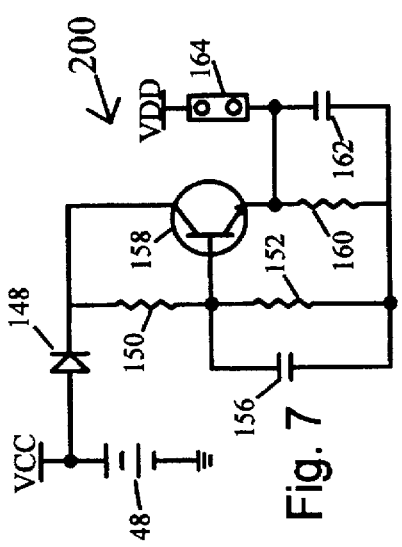
FIG. 7 shows a diagram of a power supply including polarity protection that is used in conjunction with the circuit of FIG. 6.

Now shown in FIG. 7 is a power supply circuit 200 that provides the VCC and VDD voltages and includes polarity protection. VCC (about 9 volts) is used only in the operation of motor 46 and associated LED 142 and is provided directly from batteries 48. VDD (about 4 volts) is employed in conjunction with MP 102 and is provided with polarity protection. Batteries 48 connect through diode 148, which may be of the 1N4148 type, and thence to a voltage divider network comprised of fourteenth resistor 150 (e.g., 4.1 MΩ) and fifteenth resistor 152 (e.g., 3.3 MΩ). Inadvertent connection of batteries 48 in an incorrect polarity so as to place a negative voltage on diode 150 will be seen as an open circuit so that no VDD voltage will be produced.

Fourth capacitor 156 (capacitance about 6.8 µf) connects in parallel with fifteenth resistor 152 and serves to filter out voltage ripple. The juncture of fourteenth and fifteenth resistors 150, 152 connects to the base of third transistor 158, which is a BJ transistor of the 2N3904 type and serves as a current amplifier to provide the current necessary to operate MP 102 and its associated circuitry at the required VDD voltage. The collector of third transistor 158 connects to diode 148, i.e., the base-collector circuit of third transistor 158 lies in parallel with fourteenth resistor 150. The emitter of third transistor 158 connects to ground through sixteenth resistor 160 (e.g., 3.3 MΩ), and fifth capacitor 162 (about 2.2 µf), which also serves to filter out voltage ripple, connects in parallel to sixteenth resistor 160. VDD is then taken from the base of third transistor 158 by header 164 and is thereby provided to circuit 200 as shown thereon.

The particular advantages of lubricator 10 are encompassed in part by the fact that lubricant pressures in the 80–90 psi range can be generated within a half minute or so, while at the times that lubricator 10 is in its quiescent state (i.e., motor 46 is not operating) lubricant 14 is subjected to merely the relatively low pressure of 7 psi, which is not sufficient to cause bleeding of the lubricant. Such a manner of operation is achieved by the fact that the actual emission of lubricant is not caused by pressure as such, but rather by the action of auger 38 which in effect has accepted a quantity of lubricant 14 from chamber 12 and then has actively transported the same to outlet 24.

It will be understood by those of ordinary skill in the art that other arrangements and disposition of the aforesaid components, the descriptions of which are intended to be illustrative only and not limiting, may be made without departing from the spirit and scope of the invention, which must be identified and determined only from the following claims and equivalents thereof.

We claim:

1. A fixedly mountable lubricator comprising:
   a chamber for holding a supply of lubricant;
   positively-pressured lubricant supply means for transporting lubricant from said chamber;
   auger means in immediate communication with said lubricant supply means for accepting said lubricant from said chamber and transporting said lubricant therefrom;
   said auger means further comprising:
      an auger; and
      an auger housing containing said auger;
      wherein said auger housing passes through said chamber and contains orifices for the entry therein of lubricant;
   an exit orifice disposed to receive said lubricant from said auger means;
   motor means for powering said auger; and
   mounting means for fixedly mounting said exit orifice to a point of lubrication.

2. The lubricator of claim 1 wherein operation of said motor means is controlled by a microprocessor.

3. The lubricator of claim 2 wherein said microprocessor is programmed by a set of DIP switches.

4. The lubricator of claim 1 wherein said chamber further comprises a pressure relief valve in a wall thereof.

5. The lubricator of claim 1 wherein said chamber further comprises a fitting in a wall thereof for introduction therethrough of lubricant.

6. The lubricator of claim 1 wherein said motor means are powered by one or more batteries.

7. The lubricator of claim 6 wherein said chamber further comprises a battery holder for holding therein said one or more batteries.

8. The lubricator of claim 2 wherein the timing of said microprocessor operation is controlled by a crystal circuit.

9. The lubricator of claim 2 wherein the timing of said microprocessor operation is controlled by internal programming thereof.

10. The lubricator of claim 3 wherein operation of one of said DIP switches effects a multiplication of the timing of said microprocessor operation.

11. The lubricator of claim 3 wherein operation of one of said DIP switches effects a continuous operation of said motor means.

12. The lubricator of claim 2 further comprising temperature sensing means for indicating the temperature of said lubricator.

13. The lubricator of claim 12 wherein said temperature sensing means comprise a standard resistor, a thermistor and associated capacitive circuitry.

14. The lubricator of claim 1 wherein said lubricant supply means comprises one or more springs acting against a piston that interfaces with a supply of lubricant within said chamber.

15. The lubricator of claim 2 further comprising temperature sensing means for automatically shutting off the operation thereof upon said lubricator reaching a preselected temperature.

16. The lubricator of claim 15 further comprising indicating means for providing an operator-detectable display upon said said lubricator reaching a preselected temperature.

17. A method of providing lubrication to an item of machinery comprising:
   providing a source of lubricant under positive pressure, said source being fixedly attachable to a point of lubrication;
   providing an auger in immediate communication with and functioning in cooperation with said source of lubricant and an auger housing containing said auger;
   transporting said lubricant into threads of said auger;
   attaching an end of said auger into near contiguity with an item of machinery; and
   rotating said auger, whereby lubricant is transported from said auger into said attached item of machinery.

18. The method of claim 17 further comprising controlling said auger through a microprocessor.

19. The method of claim 18 further comprising adjusting the times of operation of said auger by programming said microprocessor.

* * * * *